United States Patent
Green

(10) Patent No.: US 8,756,707 B2
(45) Date of Patent: Jun. 17, 2014

(54) METHOD OF MANUFACTURING SECURITY DOCUMENT AND METHOD FOR AUTHENTICATING THE DOCUMENT

(75) Inventor: Stephen Banister Green, Hedge End (GB)

(73) Assignee: De la Rue International Limited, Hampshire (GB)

(*) Notice: Subject to any disclaimer, the term of this patent is extended or adjusted under 35 U.S.C. 154(b) by 295 days.

(21) Appl. No.: 13/120,303

(22) PCT Filed: Oct. 2, 2009

(86) PCT No.: PCT/GB2009/002352
§ 371 (c)(1),
(2), (4) Date: May 3, 2011

(87) PCT Pub. No.: WO2010/040987
PCT Pub. Date: Apr. 15, 2010

(65) Prior Publication Data
US 2011/0283369 A1    Nov. 17, 2011

(30) Foreign Application Priority Data

Oct. 6, 2008  (GB) .................................. 0818271.9
May 5, 2009  (WO) ................ PCT/GB2009/001122

(51) Int. Cl.
*G06F 7/04* (2006.01)
(52) U.S. Cl.
USPC .......................................................... 726/30
(58) Field of Classification Search
USPC .......................................................... 726/30
See application file for complete search history.

(56) References Cited

U.S. PATENT DOCUMENTS

| | | | |
|---|---|---|---|
| 5,336,871 A * | 8/1994 | Colgate, Jr. ................... | 235/380 |
| 5,913,542 A | 6/1999 | Belucci et al. | |
| 6,726,109 B2 * | 4/2004 | Yamagishi et al. ........... | 235/492 |
| 6,918,535 B1 | 7/2005 | Brosow | |
| 7,905,415 B2 * | 3/2011 | Basson et al. ................. | 235/487 |
| 2007/0164557 A1 * | 7/2007 | Oakes ............................ | 283/74 |
| 2009/0090777 A1 * | 4/2009 | Ness ............................. | 235/441 |
| 2010/0045027 A1 * | 2/2010 | Whiteman .................... | 283/107 |

FOREIGN PATENT DOCUMENTS

| | | |
|---|---|---|
| EP | 0 991 028 A2 | 4/2000 |
| EP | 1 139 302 A1 | 10/2001 |
| EP | 1 471 461 A2 | 10/2004 |
| EP | 1 501 054 A2 | 1/2005 |

(Continued)

OTHER PUBLICATIONS

International Search Report issued in International Application No. PCT/GB2009/002352 dated Jan. 20, 2010.

(Continued)

*Primary Examiner* — Kambiz Zand
*Assistant Examiner* — Aubrey Wyszynski
(74) *Attorney, Agent, or Firm* — Oliff PLC

(57) ABSTRACT

A method of manufacturing a security document is provided, comprising: providing a first security element article having a corresponding predetermined first unique identification code which is detectable from the first security element article; incorporating the first security element article into a document; generating a machine-readable security feature containing document data representative of the first unique identification code corresponding to the first security element article and of at least a second unique identification code corresponding to a second security element applied to the document; and applying the machine-readable security feature to the document.

29 Claims, 4 Drawing Sheets

(56) References Cited

FOREIGN PATENT DOCUMENTS

| GB | WO2008053202 | * | 11/2006 |
| WO | WO 97/32262 A1 | | 9/1997 |
| WO | WO 00/38932 A1 | | 7/2000 |
| WO | WO 00/39953 A1 | | 7/2000 |
| WO | WO 2006/053685 A2 | | 5/2006 |
| WO | WO 2006/092626 A1 | | 9/2006 |
| WO | WO 2008/007064 A1 | | 1/2008 |
| WO | WO 2008/053202 A2 | | 5/2008 |
| WO | WO 2009/071673 A1 | | 6/2009 |

OTHER PUBLICATIONS

International Preliminary Report on Patentability issued in International Application No. PCT/GB2009/002352 dated Jan. 20, 2010.

International Search Report issued in corresponding International Application No. PCT/GB2009/001122 dated Jul. 28, 2009.

Written Opinion issued in corresponding International Application No. PCT/GB2009/001122 dated Jul. 28, 2009.

* cited by examiner

METHOD OF MANUFACTURING SECURITY DOCUMENT AND METHOD FOR AUTHENTICATING THE DOCUMENT

This invention relates to the manufacture of security documents such as passports, licences, currency and the like, and methods of authenticating such documents.

Secure documents such as passports, identification documents, certificates and licences are frequently the target of counterfeiters and persons wishing to make fraudulent changes to the data contained therein. Typically such documents are provided with a number of security elements for checking the authenticity of the document. These may include both security element articles which are affixed to or incorporated into the document, such as RFID chips, holographic films, magnetic threads etc, as well as features which are created on the document itself, such as colour-changing inks, security inks (e.g. IR and UV visible inks) and other printed data. Some such security elements may themselves contain personalisation information identifying the owner of the document (e.g. data giving the owner's name, a photograph or biometric data), whereas other security elements may be provided to prevent other data being manipulated (for example a holographic film overlaying printed data).

In order to determine the authenticity of the document, typically one or more of the security elements are inspected to ascertain whether they provide the expected response or whether the data contained therein corresponds to the person presenting the document, for example.

Persons wishing to produce counterfeits of such documents, or to fraudulently alter data in existing documents, typically attempt to do so by substituting security elements with similar ones obtained from other security documents or, depending on the technologies involved, manufactured themselves or obtained illegally. As the sophistication of such techniques improves, it has become more difficult to detect forgeries since in many cases the substituted security element provides the same or similar response to that which an inspector of the document expects.

In an attempt to address this problem, various approaches have been proposed whereby certain characteristics of the document are measured or otherwise detected and recorded elsewhere on the document. During authentication, the same characteristics are remeasured and compared with the recorded data to confirm that no tampering has occurred. For example, WO-A-00/38932 describes reading the printed serial number from a document such as a bank cheque and performing a cryptographic operation to arrive at a check number which is then printed or otherwise applied to the document. To confirm the document's authenticity, the serial number is read again and compared with the check number. WO-A-00/39953 discloses a watermarking technique whereby information regions on a document (such as printed data, photographs etc) are captured and used to generate a digital watermark which is embedded elsewhere on the document.

WO-A-2006/053685 discloses providing a document with one or more barcodes in which data relating to a measurable property of the document is encoded. Examples of the measurable properties made use of are: the location of elements of a printed image, or paper fibres and the relative positions of RFID chips or security threads. Similarly, EP-A-1139302 and EP-A-1501054 describe recording information visible from the document in a RFID chip provided on the document, such as the denomination of a banknote.

The present invention provides a method of manufacturing a security document, comprising:
providing a first security element article having a corresponding predetermined first unique identification code which is detectable from the first security element article;
incorporating the first security element article into a document;
generating a machine-readable security feature containing document data representative of the first unique identification code corresponding to the first security element article and of at least a second unique identification code corresponding to a second security element applied to the document; and
applying the machine-readable security feature to the document.

The present technique provides significant advantages over known methods by including in the machine-readable security feature at least one unique identification code which is integral to a security element article applied to the document. That is, the first identification code is inherent to the security element article (and detectable from the security element article alone, rather than the security document as a whole). In contrast, the measured characteristics utilised in previous methods are either taken from the relationship between such articles and the remainder of the document, or from the document substrate (or printing thereon), and do not uniquely identify security element articles. The present approach recognises that it is the substitution of security element articles (such as RFID chip's, laminate patches and security threads) which is of primary concern in combating counterfeiting, yet such substitution will not be reliably detected by the known methods. For instance, where the measured characteristics involve the position of a security element article such as a RFID tag relative to the document, it would not be difficult for a counterfeiter to replace the security element article with another of identical appearance in the appropriate position, which would remain undetected. Likewise, where visible information taken from the document is stored within an article such as an RFID tag, this could be replicated by copying the stored data.

By providing the security element article with a unique identifier, such as a number or other code, and recording the identifier in the machine-readable security feature, substitution of the security element article can be readily detected, since the identifier (if any) of the substituted security element article will no longer match the document data embodied in the machine-readable security feature. By additionally including in the MR feature at least a second unique identification code detectable from a second security element on the document (which may be another "article" or an element which is intrinsic to the substrate, such as a printed serial number), the security is significantly enhanced since both the unique ID codes must match those stored in the MR feature for a finding of authenticity to be returned. The more security elements and corresponding ID codes that are included in the MR feature, the greater the security.

The unique identification codes can take any convenient form, such as alphanumeric, symbolic or even binary, provided they serve the purpose of distinguishing one security element from many others of a similar type. For example, a serial number or barcode could be used. The identifiers may or may not be recognisable to an observer, but preferably, at least some of the identifiers are not recognisable, in order to increase the difficulty of producing a copy.

The present invention further provides a method of determining the authenticity of a security document made according to the above method, comprising:

reading the machine-readable security feature to retrieve at least one unique identification code contained therein;

detecting the first unique identification code from the first security element article;

detecting the second unique identification code from the second security element; and comparing the at least one unique identification codes retrieved from the machine-readable security feature with the first unique identification code from the first security element article and/or the second unique identification code from the second security element, to determine whether a security element identified by the machine-readable security feature is present on the document, to thereby determine whether the document is authentic.

In this way, the authenticity of a document can be judged based on the identity of at least one security element article comprised in the document, which provides a level of security over and above that achieved by simply testing the responses of the security elements or identifying that the elements are provided at the correct positions. The technique also lends itself particularly well to automation, since at least some of the identification codes as well as the security feature itself may be machine-readable. This reduces the possibility of user error.

The existence of the ID code of the security element article prior to assembly of the document also provides additional benefits in that, if desired, the relevant ID code for the article could be obtained in advance and later retrieved from a memory store when the MR feature is to be generated to thereby streamline the MR feature generation process and reduce the likelihood of error. Alternatively, however, the MR feature generation process could involve reading the ID code from the article.

The document data representing the identifiers may be embodied in the machine-readable security feature in a number of ways. In one embodiment, the document data comprises each of the at least two identifiers. That is, the machine-readable security feature could comprise a machine-readable list of the identifiers. In other embodiments, the document data comprises a code in which each of the at least two identifiers are incorporated. For example, the various identifiers could be represented by different portions of a barcode or other graphic. These embodiments could also be used in combination, certain of the identifiers being represented individually, and others incorporated into a code.

In certain embodiments, each of the security elements may be independently allocated its own identifier which may or may not match any of the other identifiers. It is preferable that the first and second ID codes are different to one another, to increase security. In this case, the document data embodied in the machine-readable security feature includes all of the identifiers corresponding to the at least some security elements to be identified. In other preferred embodiments, each of the security elements is associated with the same identifier, common to all of the security elements. That is, each of the security elements is provided with the same detectable serial code or other identifier. In this case, the machine-readable security feature need only contain that same identifier, this identifier being compared against the identifiers detected from each of the security elements to be identified.

The machine-readable security feature may be provided on the document in a number of ways. Preferably, the machine-readable security feature is readable by optical recognition (within or outside the visible spectrum). For example, the machine-readable security feature could be printed onto the document, or otherwise applied by means of a label, a transfer or the like. The feature could also comprise perforations or variations in the document thickness such as a watermark, which can be detected in transmitted light.

Advantageously, the document data is encrypted such that it is not directly intelligible to an observer. That is, even if the feature itself is visible to a user, it is not understandable without first decoding its meaning. Preferably, the machine-readable security feature comprises a 2D barcode, scrambled indicia or a digital watermark. In particularly preferred embodiments, the machine-readable security feature is not apparent in the visible spectrum, preferably being formed of a UV, IR or fluorescent ink. As well as hiding the feature from potential counterfeiters, this makes it more difficult to copy since such techniques are not readily available.

In other embodiments, the machine-readable security feature comprises a RFID chip or a magnetic strip having the document data stored therein. Whilst such features may themselves be visible to an observer, the data therein is not readily accessible without the appropriate reading apparatus. It is also more difficult to manufacture counterfeit features of this sort.

Any number of security elements may be provided on the document, and all or a selection of them may have corresponding identifiers included in the machine-readable security feature. The security elements may or may not contain personalisation information.

The first security element article can be of any type which is pre-manufactured and then affixed to or incorporated into the document substrate. In preferred examples, the first security element article comprises a contactless, readable data store, preferably a RFID chip, containing machine-readable data including the first unique identification code. In alternative embodiments, the first security element article comprises a film for application to the document, the film having the first unique identification code printed, engraved or perforated thereon. Preferably, the film is a polymeric film and may comprise optically variable regions.

In other advantageous examples, the first security element article comprises a security thread, preferably a magnetic thread, containing machine-readable data including the first unique identification code. Alternatively, the first security element article may comprise an optically active element, preferably a hologram, carrying the first unique identification code. Preferably, the optically active element is modified to carry the first unique identification by printing, laser engraving or perforation.

The second security element could comprise any of the above mentioned exemplary security element articles (containing the second unique ID code), or could comprise a feature inherent to the document substrate, printed, engraved, perforated or otherwise.

In preferred implementations, the method further comprises applying one or more additional security elements to the document, each additional security element having a respective unique identification code, and incorporating the respective unique identification codes into the document data before the machine-readable security feature is applied to the document. As indicated previously, the greater the number of ID codes recorded in the MR feature, the greater the security enhancement. The additional security element(s) could comprise elements of any of the types already discussed with respect to the second security element.

Alternatively, in preferred examples, at least one of the additional security elements may comprise at least a portion of the document surface, and the method further comprises measuring a surface characteristic of the document surface portion and recording the measured characteristic to provide the corresponding unique identification code. In this way, the MR feature and all of the other security elements it references are firmly linked to the document substrate itself. In similar examples, any dimension, thickness, weight or other measurable characteristic of the document, or a feature thereof, could be used. Advantageously, the surface characteristic is obtained by laser surface analysis of the at least a portion of the document surface.

As noted above, it is generally preferable that the identifiers associated with each security element are detectable by machine so that authentication can be carried out automatically. However, such identifiers may still be detectable by a user, e.g. printed data. In some embodiments, it is preferable that the one or more security elements comprises readable indicia incorporating a corresponding identifier which can be compared by an observer against the document data contained in the machine-readable security feature. This enables authentication to be carried out with only one machine reading step (or even manually, if the machine-readable security feature is additionally intelligible to an observer).

Any number of security elements and corresponding identifiers could be provided. The more security elements for which identifiers are incorporated into the machine-readable security feature, the more difficult the document is to forge.

The technique can be applied to any document, but preferably, the document is a booklet document comprising more than one page, at least one of the two or more security elements being provided on a first page, and the machine-readable security feature being provided on a second page of the booklet document. In this way, substitution of one or other of the pages will be readily detected.

Advantageously, the security document is a document of value, preferably a passport, identification document, banknote, certificate, or licence.

In the method of authenticating, the data contained in the machine-readable security feature may be extracted in any manner appropriate for the type of feature in question. Preferably, the machine-readable security feature is read by an optical scan of at least a portion of the document.

Likewise, the unique identification codes may be detected using techniques appropriate to each security element type. Preferably, the identifier associated with at least one of the security elements is detected by at least one of:
 an optical scan of the security element;
 radio frequency interrogation;
 magnetic interrogation;
 visual observation by a user; and
 laser surface analysis.

Advantageously, the document data contained in the machine-readable security feature is encrypted, and the method further comprises decrypting the document data to retrieve the at least one identifier.

Depending on the level of security required, not all of the identifiers stored in the machine-readable security feature need be checked against the corresponding security elements. However, preferably, the identifiers associated with each of the security elements for which identifiers are retrieved from the document data are detected and compared with the retrieved identifiers.

Examples of documents and methods of authentication in accordance with the present invention will now be described with reference to the accompanying drawings, in which:

FIG. 1 schematically illustrates a first exemplary security document;

Figure 1:
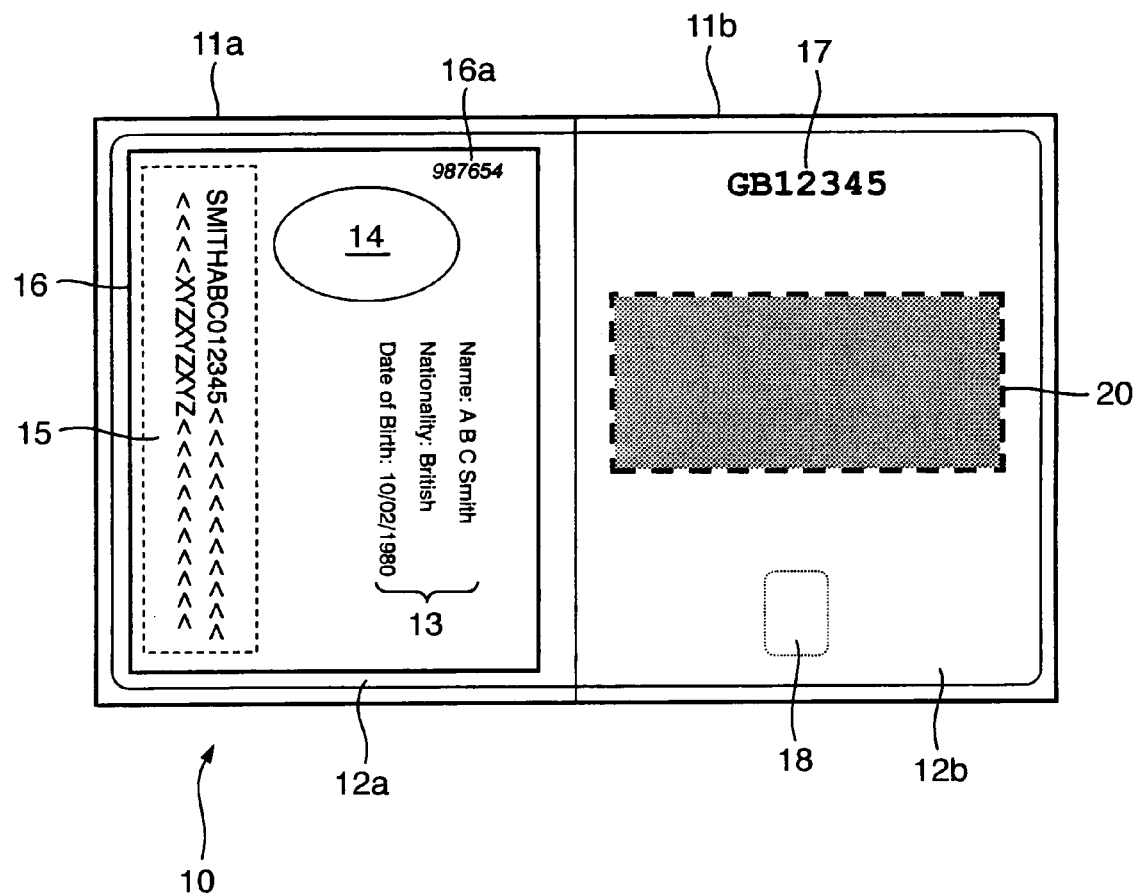

The following description will focus on the example of a passport document. However, as noted above, the present technique can be applied to any type of security document. The invention is most advantageously used in secure documents/documents of value. In the context of a passport, problems that the present arrangement may be able to help detect include:—
 1. Substitution of the MRP (Machine-readable Passport) Data Page
 2. Fraudulent Changes to the Data Page (MRZ Zone/Photo)
 3. Substitution of the Film (e.g. a holographic overlay film)
 4. Chip or Inlay Substitution
 5. Substitution of the page with the passport number on
 6. Substitution of a page with a laser perforated number A exemplary passport document 10 made using the presently-disclosed methods is shown schematically in FIG. 1. The document is of a booklet configuration, having a front cover 11a, a back cover 11b and internal pages including a data page 12a and an adjacent page 12b. On the data page 12a is typically provided personalisation information, such as printed information 13, including the document owner's name, nationality and date of birth, for example, and a photograph 14 of the owner. Commonly, the data page 12a includes a machine-readable zone 15 ("MRZ"), in which are printed letters, numbers and other symbols, which can be scanned and processed using optical recognition to retrieve data. The boundary of the MRZ 15 is indicated in FIG. 1 using broken lines but in practice this is not typically made visible.

To protect the personalisation data 13, photograph 14 and MRZ 15, at least a portion of the data page 12a may be covered with a film 16. This typically comprises a polymeric film which is laminated to the page 12a using adhesive and/or heat sealing. The film 16 preferably includes features such as holograms, colour changing inks or other optically variable elements such that the film cannot easily be reproduced. By covering the data on data page 13 with the film 16, the data cannot be changed without first removing the film 16, which process will typically damage or destroy the film and the security features contained therein.

The document is typically also provided with information on one or more other pages, such as passport number 17 which here is shown on the adjacent page 12b though in practice may be reproduced on every page of the document. The passport number may be printed or could be provided by perforations, for example laser perforations. The passport number 17 may include a check digit symbol such as that disclosed in our International Patent Application Number PCT/GB2007/002551.

The document preferably also includes a data store which can be read without direct contact, such as a RFID chip 18. FIG. 1 indicates the RFID chip 18 in the vicinity of internal page 12b, but in practice the RFID chip 18 would typically be provided on the inside face of front cover 11a or back cover 11b, connected to a suitable antenna (not shown). The data contained in RFID chip 18 can be read using a suitable radio frequency reading device as is well known in the art.

It will be appreciated that the above identified security elements fall broadly into two categories: security element "articles" which are manufactured independently of the document substrate and then affixed to the document by adhesive or otherwise, such as the RFID chip 18 and laminate film 16. A further example would be a security thread which can be affixed to or incorporated within the page or a holographic transfer patch, for example. Each of these articles is provided with a detectable ID code prior to incorporation into the document. For instance, RFID chips are typically provided with a unique serial number during manufacture, independently of any biographical or other data that may later be programmed. It is not possible for the unique serial number to be changed (it is not re-writeable). Laminate film 16 can be provided with an ID code by printing or perforation (for example), before application to the document 10.

Other elements, such as the passport serial number 17 and MRZ 15, are created only upon printing (or perforating) the document substrate.

To correlate the key security elements found in an MRP (Machine-readable Passport) or ePassport, and to provide a means of detecting whether any of the features have been substituted or changed, the adjacent page 12b (the one opposite to the MRP data page 12a) of the passport 10 is arranged to hold data relevant to at least some of the above-described security elements 15, 16, 17 and 18, including at least one security element "article". This is achieved by providing a machine-readable security feature 20 on page 12b containing document data in which is incorporated a number of unique identifiers associated with at least some of the security elements 15 to 18.

In this embodiment, each of the security elements 15 to 18 has been allocated an individual identification code. The manner in which this is done will depend on the type of security element in question. The identifier may be intrinsic to the security element (e.g. a serial number automatically applied to the element during manufacture), or may be added specially (e.g. printed onto the security element). Generally, the identifier serves to identify the security element itself, rather than the owner of the document: it is preferable that there is no correspondence between the personalisation details and the identifier applied. In this example, MRZ 15 includes an identifier "XYZXYZXYZ" in its machine-readable text. This identifier may form part of other information or could be designated as standalone data. The film 16 has marked thereon an identifier 16a formed of the number "987654". The identifier 16a is preferably printed onto the film prior to lamination, on the side of the film 16 which adheres to the data page 12a. Advantageously, the identifier 16a is printed in an ink which responds only outside the visible spectrum (e.g. IR or UV ink), such that it is not visible to an observer.

The passport number 17 which is typically printed on or perforated into several internal pages of the document forms its own inherent identifier, in this case consisting of the code "GB12345". The number 17 is typically configured in such a way that the code can be captured using optical recognition techniques. The code may also include a check digit as mentioned above and this can be used on its own or in combination with the rest of the code as an identifier.

The RFID chip 18 is preferably encoded with a serial number during manufacture, as well as personalisation information relating to the passport holder. The serial number can be used as an identifier and can be retrieved by interrogating the RFID chip in the usual way.

Some or all of the above identifiers, including at least one corresponding to the RFID tag 18 or the laminate film 16 (i.e. a security element article) are incorporated into document data held by the machine-readable security feature 20. In this embodiment, this is provided in the form of an optically and/or magnetically recognisable printed code applied to page 12b of the document. The code could alternatively be applied in the form of a label, transfer, perforations, etc. Any other page could be used for the feature 20, but the page adjacent the data page 12a is convenient since this is the page the document will be opened to in the usual course of authentication.

Figure 2:
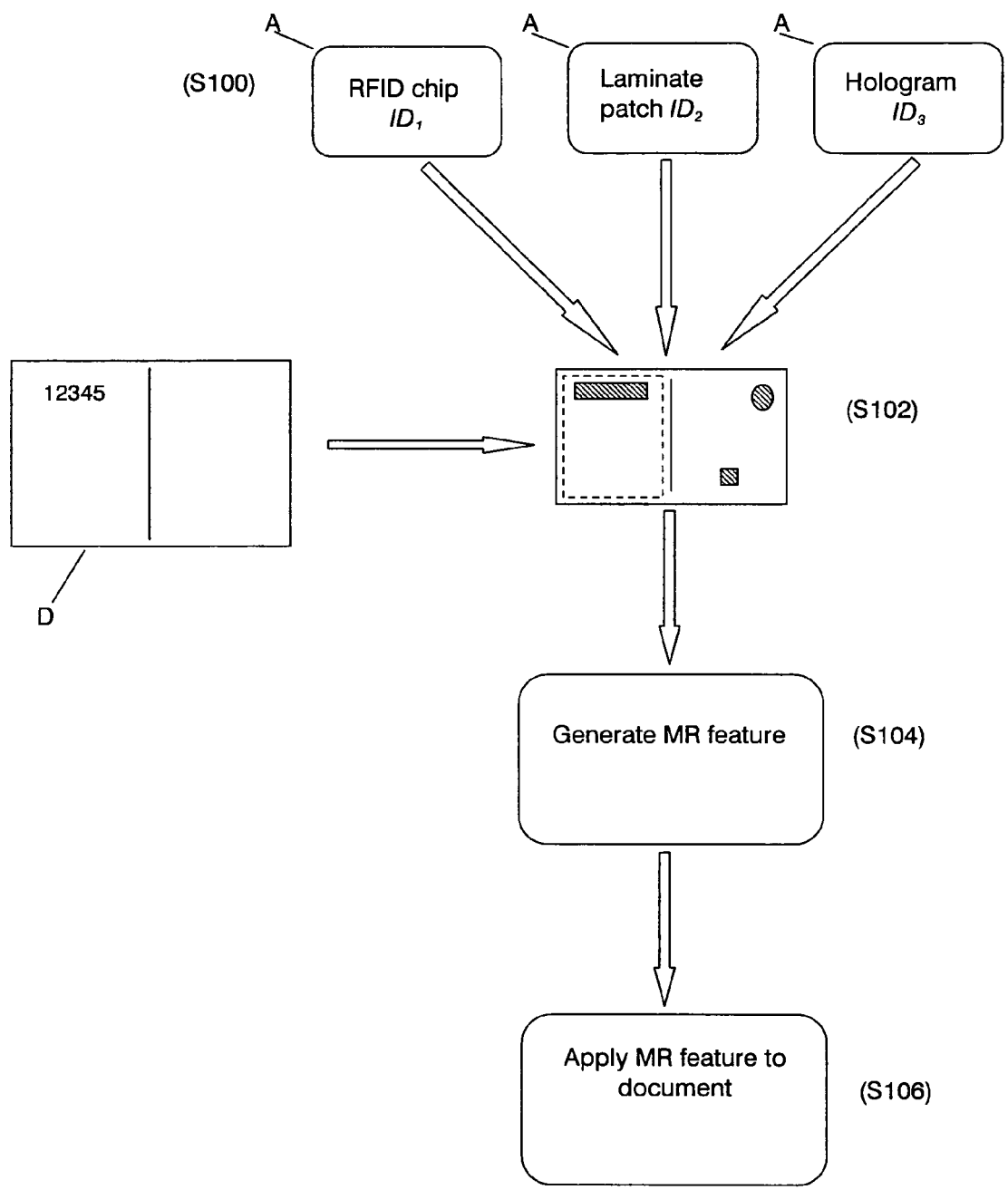
FIG. 2 is a flow diagram showing an embodiment of a method for manufacturing the security document of FIG. 1.
Figure 3:
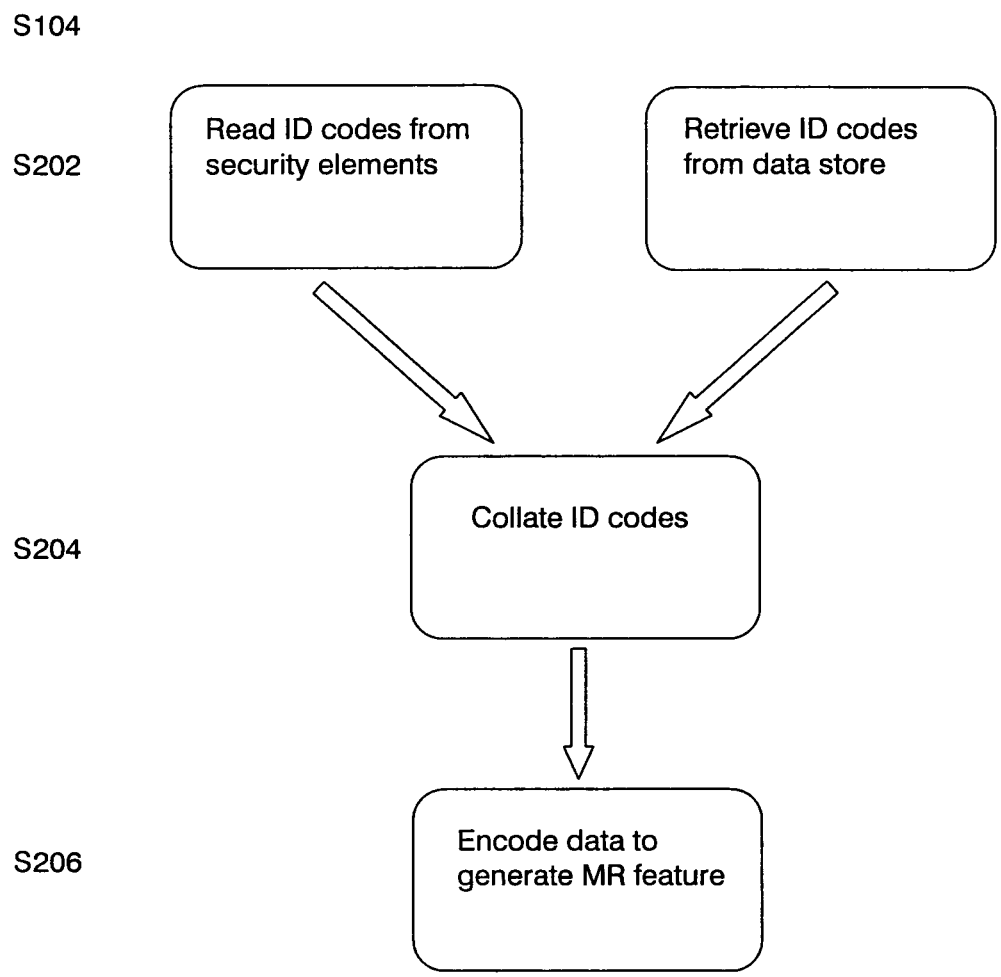
FIG. 3 is a flow diagram showing steps which may be involved in the generation of a MR security feature.

The feature 20 can be generated and applied in a number of ways. FIGS. 2 and 3 show steps involved in the production of the security document. In FIG. 2, an exemplary manufacturing process is shown in which three security element articles A are to be provided on the security document. In this example, the articles include an RFID chip, a laminate patch and a hologram, provided in step S100. As previously described, each of these articles incorporates an identification code which is detectable from the article. For instance the RFID chip contains a serial number constituting its identification code $ID_1$, the laminate patch has printed thereon an identification code $ID_2$ and the hologram has a laser engraved identification code $ID_3$. An incomplete passport document D is provided which may already incorporate one or more security elements, such as security prints and, in this case, a perforated serial number "12345". The security document D could at this stage already be printed with personalization information if desired. In step S102, the three security element articles A are affixed to the passport document D using appropriate techniques. It should be noted that the security element articles need not all be applied to the passport document in the same step of the process. For instance, the RFID chip may be embedded into the passport cover during manufacture of the cover material, the hologram may be applied prior to printing any personalization information and the laminate patch may be adhered to the passport document once personalization is complete. In step S104, the machine-readable feature is generated and this will be described in further detail below in relation to FIG. 3. However, it should be noted that at least some of the generation steps could alternatively take place before any or all of the security element articles are applied to the document D. Finally, in step S106, the generated machine-readable feature is applied to the document. Again, in practice this need not be the last step of the process since further security elements could be added to the document after the MR feature has been applied. For example, the MR feature could be provided underneath the laminate patch.

Turning to FIG. 3, steps of the machine-readable security feature generation process are shown. In the first step, S202, identification codes to be included in the machine-readable feature are obtained. Depending on the nature of the security element in question, this may either involve reading the identification codes from the respective security elements or retrieving certain identification codes from a data store, or a combination of both. For example, during manufacture of the passport document, the ID code of the RFID chip, laminate patch or hologram can be recorded in the database before the article is applied to the document. If this database is made available to the MR generation process, these identification codes could therefore be retrieved directly from the data store, rather than reading the elements for a second time. However, if the machine-readable security feature generation process is taking place at a remote location, it may be preferable to retrieve the codes from the security elements themselves.

In step S204, once the respective ID codes have been retrieved, these are collated and in step S206 the collated document data is encoded to form the machine-readable feature. The nature of the encoding step will depend on the form of machine-readable feature desired.

The machine-readable security feature conveniently embodies the "document data" in a 2D barcode, such as a PDB™ barcode by De La Rue International Limited, or the like. Any type of barcode can be used such as linear barcode, stacked 2D Barcodes (for example Codablock-F and PDF417), and matrix 2D barcodes (for example, Aztec Code, Datamatrix or Semacode). Suitable barcodes and techniques for encoding and decoding the data are disclosed in EP-A-0954801 and EP-A-1471461 to Cobblestone Software, Inc. Providing the security feature 20 in a format such as a barcode is advantageous because the data contained therein is not directly intelligible to an observer. Further, the potential amount of data which can be stored in the feature 20, and therefore to some degree its security, is significant. Using a barcode allows a greater density of information to be stored per unit area compared with techniques such as digital watermarking. Also, since the barcode can be unique in its structure, it makes fraudulent alteration of the code extremely difficult. However, in other examples it may be preferred to have at least some of the data in a format which is directly understandable to a user, for example printed in the form of machine-readable text or numbers.

More than one such barcode or other feature may also be provided, collectively making up the machine-readable security feature. In some cases, the various identification codes might be represented individually (i.e. with a code or symbol for each identifier), whereas in other cases the identifiers may be combinedly represented in one code or symbol (such as is the case in the above-mentioned bar code).

For further improved security, the feature 20 may be rendered using security ink, such as an ink which is not perceivable to the human eye under usual lighting conditions, for example a yellow invisible fluorescent ink, or a magnetic ink (which may or may not be visible). The fact the code can be printed in invisible inks adds an additional level of security and complexity to any potential fraudulent alteration or counterfeit attempts.

In this embodiment, the barcode 20 is printed onto page 12*b* opposite to the MRP page 12*a* in a resolution that can be detected and read reliably by the optical scanner of an ePassport page reader. Any software that is required for decoding the barcode or other feature can be incorporated into the reader or into a computer system with which the reader communicates. The fact that the decoder software is built into a passport reader makes reverse engineering of the barcode decoder difficult. Since the feature 20 is machine-readable, the process of checking and verification can be automatically performed.

The barcode 20 may be read by a dedicated application installed on the passport reader; this would read the barcode, decode the information and then check that all the data matched with that detected elsewhere (from the selected security elements 15 to 18). Although this process could be done on the front desk, at an immigration point, it is more likely to be implemented as a back office check as it may require two separate scans of the passport (e.g. the MRP page 12*a* and adjacent page 12*b* in the above embodiment) and/or more sophisticated detection methods for detecting each of the identifiers from the security elements 15 to 18.

It should be noted that whilst the barcode has advantages, as noted above, the use of a barcode is not essential. For example the feature 20 could comprise scrambled indicia (e.g. the document data visually scrambled for reassembly by a suitably programmed reader) or a digital watermark. Alternatively the document data could be printed onto page 12*b* (or any other page) or stored in some other way in the document 10 (e.g. in the RFID chip 18 or on a magnetic strip). An extension to this would be to hold the document data centrally on a database (as the information would be generated before or during personalisation of the passport) together with the applicant's other biometric and biographic data, with the feature 20 containing a key code for looking-up the relevant identifiers in the database. Information as to which identifier should correspond to which security element would be pre-programmed. This would enable verification to take place against data held on a central database rather than in the passport itself.

Figure 4:
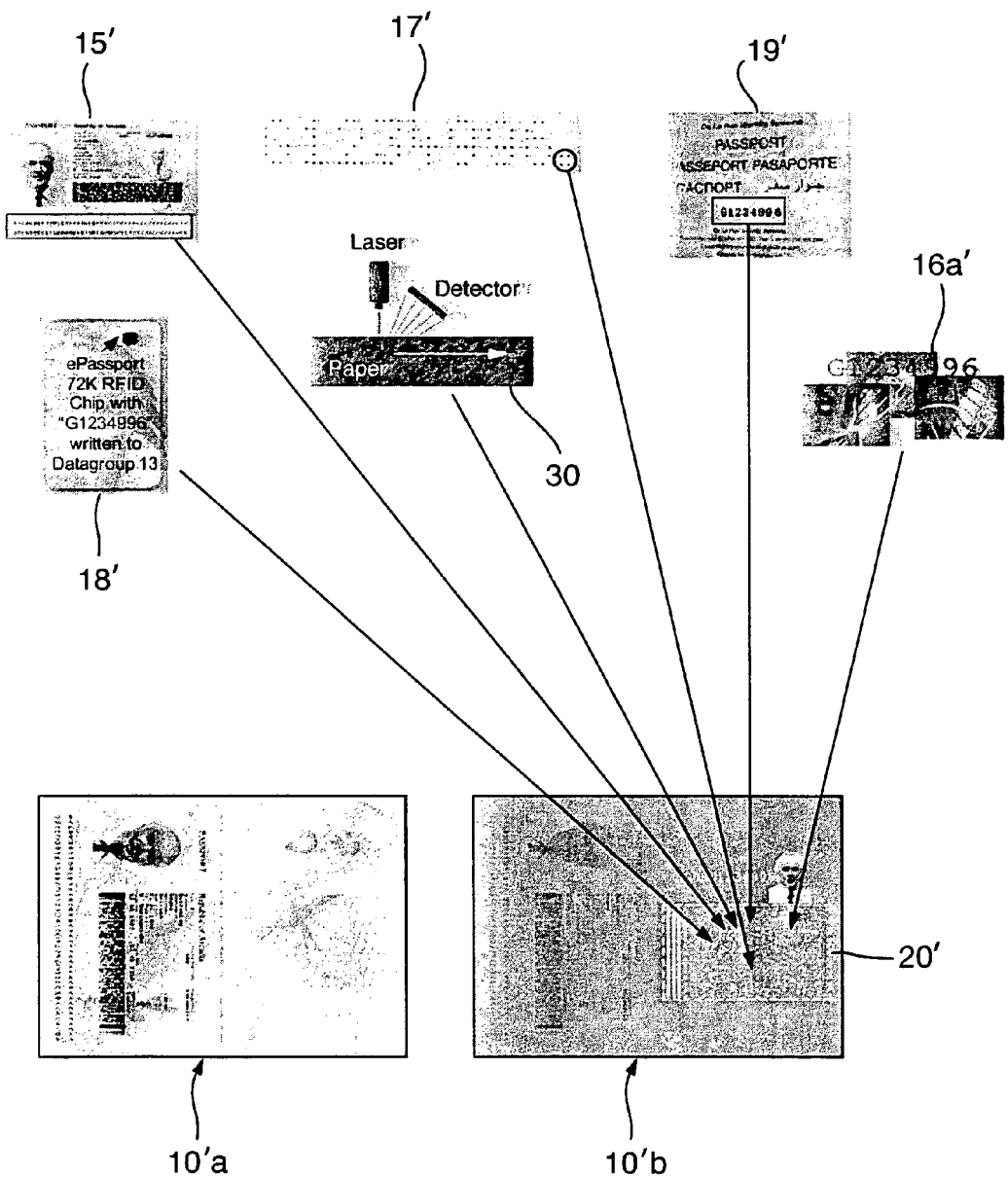
FIG. 4 shows a second exemplary security document viewed in daylight and under UV, with the security elements illustrated at an enlarged scale for clarity.

In a second example, depicted schematically in FIG. 4, the document 10' (shown in daylight at 10'*a* and as a UV simulation at 10'*b*) is provided with security elements 15' to 18' which correspond to those described in the first example, the reference numerals having the addition of a prime ('). Here, the passport number 17' is formed by laser perforation and includes a check symbol (circled), and a further security element 19' is provided in the form of a printed number. Optionally, the second embodiment further includes an extra security feature 30 provided by measuring a characteristic of the document 10'. This is described in more detail below.

In this example, all of the security elements 15' to 19' are associated with the same identifier, "GB1234996". MRZ 15' includes "GB1234996" on the second line of machine-readable text. The code 16*a*' provided on the laminate film is also "GB1234996", as is the passport number both laser-perforated 17' and printed 19' onto the document. The RFID chip 18' is programmed with the code "G1234996" in its Datagroup 13 or Datagroup 1 sector, for example. The same code "GB1234996" is stored in the document data embodied by the machine-readable security feature 20', which in this case is a 2D barcode but could take any appropriate form as described in the previous example. The document data could include the code repeated for each security element. However, since the code is the same for all security elements 15' to 19', the code need only be stored once in the machine-readable security feature 20', and can be checked against each of the selected security features.

The first and second examples could also be used in combination with each other, for example, a code common to a subset of the security elements (e.g. passport numbers 17' and 19') could be stored alongside individual identifiers for other elements (e.g. the RFID chip 18' and the laminate code 16*a*').

The second embodiment also makes use of an optional security element 30 in the form of a measured characteristic of the document 10'. In this case, the characteristic is the surface roughness of the document substrate, which can be detected by laser surface analysis. It has been found that many document substrates, such as paper, exhibit surface roughness at a microscopic level which varies from place to place on the substrate, and between substrates (even those of the same type). Hence measuring and recording the surface roughness of a defined area of a substrate is akin to recording a person's fingerprint. Security element 30 therefore consists of a stored surface roughness profile which has been measured for at least a portion of the surface of the document 10', preferably from a page other than that on which the feature 20' is placed. When a document requires authentication, laser surface analysis of the specified area is performed, and the result compared with that retrieved from the document data in the machine-readable security feature 20'.

Other comparable measurements can also be used as security elements. For example, the measurement could be taken from an element (including a printed element) applied to the document 10' rather than the document itself. For example, the exact dimensions of a line printed in invisible ink could be recorded. Or, if there is a measurable variation in standard page dimensions, weight or thickness, any one or more of these could be measured and recorded.

The scope of the number and/or type of security elements can be a large or small as is required, and could for instance include such features as a laser perforation check digit, laminate film number, taggant information (RFID chip number) etc., as described above. The security elements selected will depend on the application for which the document is intended. Further, it should be noted that not all of the security elements provided on the document need be provided with an identifier and/or recorded in the machine-readable security feature. For example, the document may additionally be provided with holograms, embossings, watermarks or any other security elements which may or may not be associated with an identifier recorded in the security feature.

Finally it should be noted that each identification code need not be 'programmed' as such, into the respective security element. A first example is the use of a measured characteristic of the document surface, identified as security element 30 above. In another example, where one of the security element articles is an RFID chip, its identifier can be descriptive of its contents, for instance if the chip contains three Datagroup sectors 1, 2 and 7, then this information can be stored in the machine-readable security feature as the identifier. If the chip is substituted or the contents of the chip are modified (e.g. a Datagroup is removed), this will be identified by checking the machine-readable feature.

Alternatively, the identifier could include a signature of some of the data in the RFID chip. The signature would be generated using the same key as that used to sign the chip data and could be verified using the "Document Signer" key stored in the chip. This is a digital certificate containing a public key which can be used to decrypt a digital signature and verify that it was encrypted with a corresponding private key. The certificate will have been digitally signed by a trusted Certificate Authority and therefore can be validated for authenticity.

Similar 'descriptive' unique identification codes can be generated for any of the security elements.

The invention claimed is:

1. A method of manufacturing a security document, comprising:
providing a first security element article having a corresponding predetermined first unique identification code which is detectable from the first security element article;
incorporating the first security element article into a document;
generating a machine-readable security feature containing document data representative of the first unique identification code corresponding to the first security element article and of at least a second unique identification code corresponding to a second security element applied to the document; and
applying the machine-readable security feature to the document.

2. A method of manufacturing a security document according to claim 1, wherein generating the machine-readable security feature comprises obtaining the first unique identification code and the second unique identification code by reading the respective unique identification code from the respective security elements and/or by retrieving the respective identification codes from a memory store, and generating the document data based on the obtained identification codes.

3. A method of manufacturing a security document according to claim 1, wherein the document data comprises each of the first and second unique identification codes individually.

4. A method of manufacturing a security document according to claim 1, wherein the document data comprises a code in which each of the first and second unique identification codes are incorporated.

5. A method of manufacturing a security document according to claim 1, wherein the first and second unique identification codes are the same.

6. A method of manufacturing a security document according to claim 1, wherein the machine-readable security feature is readable by optical recognition or magnetic recognition.

7. A method of manufacturing a security document according to claim 1, wherein the document data is encoded or encrypted such that it is not directly intelligible to an observer.

8. A method of manufacturing a security document according to claim 1, wherein the machine-readable security feature comprises a 2D barcode, scrambled indicia or a digital watermark.

9. A method of manufacturing a security document according to claim 1, wherein the machine-readable security feature is not apparent in the visible spectrum.

10. A method of manufacturing a security document according to claim 1, wherein the machine-readable security feature comprises a RFID chip or a magnetic print or a strip having the document data stored therein.

11. A method of manufacturing a security document according to claim 1, wherein the first security element article comprises a contactless, readable data store, containing machine-readable data including the first unique identification code.

12. A method of manufacturing a security document according to claim 1, wherein the first security element article comprises a film for application to the document, the film having the first unique identification code printed, engraved or perforated thereon.

13. A method of manufacturing a security document according to claim 12 wherein the film is a polymeric film.

14. A method of manufacturing a security document according to claim 1, wherein the first security element article comprises a security thread, containing machine-readable data including the first unique identification code.

15. A method of manufacturing a security document according to claim 1, wherein the first security element article comprises an optically active element, carrying the first unique identification code.

16. A method of manufacturing a security document according to claim 15, wherein the optically active element is modified to carry the first unique identification code by printing, laser engraving or perforation.

17. A method of manufacturing a security document according to claim 1, wherein the second security element comprises any of:
a machine-readable code printed on the document and including the second unique identification code;
a machine-readable code laser-marked onto the document and including the second unique identification code;
a contactless, readable data store, containing machine-readable data including the second unique identification code;
a film for application to the document, the film having the second unique identification code printed, engraved or perforated thereon;
a security thread, containing machine-readable data including the second unique identification code; and an optically active element, carrying the second unique identification code.

18. A method of manufacturing a security document according to claim 1, further comprising applying one or more additional security elements to the document, each of the one or more additional security element having a respective unique identification code, and incorporating the respective unique identification codes into the document data before the machine-readable security feature is applied to the document.

19. A method of manufacturing a security document according to claim 18, wherein the one or more additional security elements comprise any of:
   a machine-readable code printed on the document and including a respective unique identification code;
   a machine-readable code laser-marked onto the document and including a respective unique identification code;
   a contactless, readable data store, containing machine-readable data including a respective unique identification code;
   a film for application to the document, the film having a respective unique identification code printed, engraved or perforated thereon;
   a security thread, containing machine-readable data including the a respective identification code; and
   an optically active element, carrying a respective unique identification code.

20. A method of manufacturing a security document according to claim 18, wherein at least one of the one or more additional security elements comprises at least a portion of the document surface, and the method further comprises measuring a surface characteristic of the document surface portion and recording the measured characteristic to provide the respective unique identification code.

21. A method of manufacturing a security document according to claim 20, wherein the surface characteristic is measured by a laser surface analysis of the at least a portion of the document surface.

22. A method of manufacturing a security document according to claim 1, wherein the document is a booklet document comprising more than one page, at least one of first security element article or the second security element being provided on a first page of the booklet document, and the machine-readable security feature being provided on a second page of the booklet document.

23. A method of manufacturing a security document according to claim 1, wherein the security document is a document of value.

24. A method of determining the authenticity of a document, the document being manufactured in accordance with claim 1, the method comprising:
   reading the machine-readable security feature to retrieve at least one unique identification code contained therein;
   detecting the first unique identification code from the first security element article;
   detecting the second unique identification code from the second security element; and
   comparing the at least one unique identification code retrieved from the machine-readable security feature with the first unique identification code from the first security element article and/or the second unique identification code from the second security element, to determine whether a security element identified by the machine-readable security feature is present on the document, to thereby determine whether the document is authentic.

25. A method according to claim 24, wherein at least two unique identification codes are retrieved from the machine-readable security feature; and the at least two retrieved unique identification codes are compared with the first and second unique identification codes to determine whether the document is authentic.

26. A method according to claim 24, wherein the machine-readable security feature is read by an optical or a magnetic scan of at least a portion of the document.

27. A method according to claim 24, wherein the first and/or second unique identification code is detected by at least one of:
   an optical scan of the security element;
   radio frequency interrogation;
   magnetic interrogation;
   visual observation by a user; and
   laser surface analysis.

28. A method according to claim 24, wherein the document data contained in the machine-readable security feature is encrypted, and the method further comprises decrypting the document data to retrieve the at least one unique identification code.

29. An apparatus configured to apply the machine-readable security feature according to claim 1.

* * * * *